United States Patent Office 2,711,030
Patented June 21, 1955

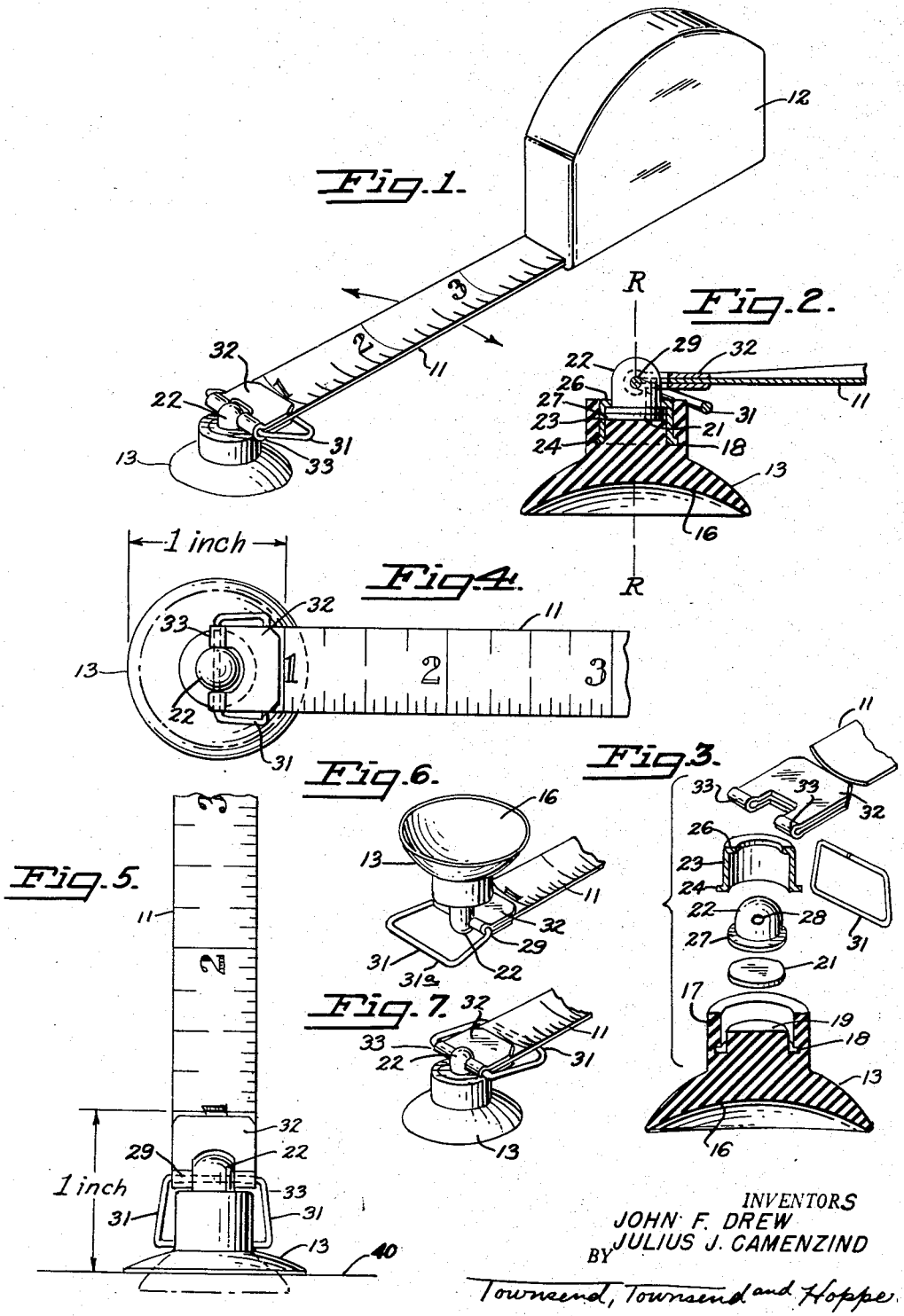

2,711,030

MEASURING TAPE CONSTRUCTION

John F. Drew, Belmont, and Julius J. Camenzind, Redwood City, Calif.

Application April 19, 1954, Serial No. 424,032

2 Claims. (Cl. 33—137)

This invention relates to a new and improved flexible tape measuring unit.

The particular embodiment of the invention which is illustrated in the drawings and which will be described hereinafter in more detail comprises a flexible measuring tape graduated in consecutively numbered units of measure (such as inches) from a first end of the tape toward the opposite end thereof. The first end of the flexible tape is attached by universal coupling means to a suction cup which, in turn, is resiliently compressible against a flat surface so as to temporarily anchor the first end of the tape in suction engagement with the surface. The universal coupling, in turn, permits the the flexible tape to be extended in any direction or plane outwardly from the suction cup so that by engaging the suction cup to any flat surface from which measurement is to be taken, the user may extend the tape to measure distances in either a horizontal, vertical or diagonal plane.

A principal object, therefore, of the present invention is to provide a novel means for temporarily anchoring one end of the tape, through suction cup engagement with a flat surface, to facilitate the measuring of distances from said point of engagement.

A novel feature of the invention resides in the fact that the suction cup and universal coupling means are dimensioned and arranged relative to the units of measure marked on the tape so that regardless of in which direction or plane the tape is extended from the suction cup, an accurate measure of distance can be read directly off the tape without the necessity of a user having to make allowances or compenate for the width, thickness or height of the suction cup attachment or for the change in dimensions which said cup undergoes due to the resilient deformation of the cup material when compressed against a flat surface. The details of this particular feature of the invention will be explained more fully hereinafter.

Other numerous objects and advantages of the invention will become apparent upon reading the following specification and referring to the accompanying drawings in which similar characters of reference represent corresponding parts in each of the several views.

In the drawings:

Fig. 1 is a perspective view of a flexible tape measuring unit embodying the invention.

Fig. 2 is an enlarged fragmentary vertical sectional view through the suction cup end of the tape measure unit.

Fig. 3 is an enlarged perspective view of the suction cup and the coupling assembly with the parts shown in exploded relationship, and with certain parts shown in section.

Fig. 4 is an enlarged fragmentary plan view of the suction cup end of the unit and with the tape extended in a direction perpendicular to the medial axis of the suction cup.

Fig. 5 is an enlarged fragmentary side elevational view of the suction cup end of the unit showing the tape extended in the direction of the medial axis of the suction cup.

Fig. 6 is a perspective view of the suction cup end of the unit shown in one position of use.

Fig. 7 is a perspective view of the suction cup end of the unit shown in a second position of use.

Referring now more particularly to the drawings, the embodiment of the invention therein illustrated is shown as comprising a conventional flexible spring metal tape 11 which is consecutively numbered in inches throughout its length. The reference numeral 12 in the drawings designates a casing of conventional design and which incorporates a suitable tape winding assembly to permit extension or retraction of the tape with respect to the casing. As above indicated, the casing construction and the winding mechanism incorporated therein may be of any conventional design such as the types indicated in United States Patents Numbers 1,964,280 and 1,987,652. Thus, the casing and tape winding components do not in themselves constitute a part of the present invention.

The outer or free end of the tape is shown as being connected by means of a universal coupling to a suction cup indicated at 13. More specifically, the suction cup defines a concave recess 16 and is made of rubber or other yieldably resilient material which can be compressed into engagement with a flat surface to exhaust air from the recess and thereby create a suction engagement between the cup and the surface.

The upper portion of the suction cup terminates in a raised seat portion 19 within a tubular portion 17, the latter being annularly grooved as at 18.

The universal coupling for connecting the suction cup to the end of the tape measure is shown as comprising a bearing or wear plate 21, adapted to rest upon rubber seat 19, and also adapted to slidably rotatably support pintle 22. To maintain the flat under surface of pintle 22 in bearing engagement with plate 21, we provide a tubular pintle housing 23 having an outwardly extending bottom flange 24 and an inwardly turned upper flange 26. Bottom flange 24 is adapted to be resiliently received within the elastic material of the suction cup defining annular groove 18, whereas the inwardly turned flange 26 of the housing is adapted to overlie complementary flange 27 provided around the base of pintle 22. When the foregoing named parts are assembled in the manner as shown in Fig. 2, the pintle 22 is free to rotate within housing 23 with its base bearing against plate 21 and with the upper surfaces of flange 27 in bearing engagement with inwardly turned flange 26 of said housing.

The outer projecting end of pintle 22 is apertured as at 28 to rotatably receive and carry a hinge pin 29. Preferably, the hinge pin may be formed as an integral portion of an anchoring eye or loop 31 which, in turn, may be advantageously utilized in a manner to be hereinafter described.

The outer end of the tape 11 may be connected to hinge pin 29 by a hinge leaf 32. Leaf 32 is shown as comprising a bifurcated integral piece of sheet metal defining hinge pin receiving eyes or gudgeons 33. The end of the tape 11 may be crimped and secured by spot welding or the like between the flat portions of hinge leaf 32.

From the foregoing, it is seen that the combination pintle and hinge assembly establish, in effect, a universal coupling between the suction cup and the tape end which permits the tape to be extended in any desired direction or plane away from the suction cup.

It is characteristic of suction cups of the type illustrated at 13 in the drawings that when the cup is compressed against a flat surface into suction engagement therewith, the base of the cup will flatten out and consequently enlarge in its circumference. Moreover, when the suction cup is compressibly flattened into suction engagement with a surface, the top surface of the cup will move correspondingly nearer or closer to the surface to which the suction cup is applied. It is in recognition of the fact that the suction cup material is subject to deformity and change in certain of its dimensions as above noted that certain unique features of the unit now to be described have particular reference.

More specifically and referring to Fig. 5, the suction cup is shown in solid lines in its compressed or flattened condition that it assumes when forced into suction engagement against a flat surface, such as indicated schematically by reference line 40. The base of the suction cup as it would appear before being compressibly forced into suction engagement with a flat surface is shown in broken lines. It is observed that when the suction cup is compressed against surface 40 as shown in full lines, the diameter of the cup base flattens out and enlarges. Moreover, the top surface of the cup carrying the pintle 22 is moved closer or nearer to the flat surface 40 when the cup has been compressed into engagement with respect thereto. Fig. 5 illustrates the unique feature heretofore briefly explained—namely, when the suction cup is compressed into engagement with the flat surface, the distance between the plane of the flat surface to which the cup is engaged and the first numbered graduation on the tape— i. e., the one inch mark of the tape—equals the unit of measure (in this case one inch) indicated by the said numbered graduation when the tape is extended outwardly from the suction cup in the direction of the medial axis of the cup (indicated by the reference line R—R in Fig. 2). Thus, it is seen that when a measurement is to be taken from a flat surface to which the suction cup is engaged, a correct reading may be taken directly off of the tape and without the necessity of a user having to compensate or make allowances for the deformable change in shape and size that the suction cup undergoes when compressed into suction engagement with the surface.

Fig. 4 specifically illustrates the feature that an accurate reading may be taken directly off the tape when it is extended from the suction cup in a direction substantially perpendicular to the medial axis R—R of the suction cup. In this connection, the inner dotted circle designated by the reference line 13 indicates the circumference of the suction cup base before it is compressed into suction engagement against a flat surface. The larger circle in solid lines (also designated by the reference character 13) discloses the position and size of the suction cup base when compressed in suction engagement with a flat surface. It is observed that when the tape is extended in a direction perpendicular to the medial axis of the suction cup, the distance parallel to the tape between the outermost point on the periphery of the flattened base of the suction cup and the one inch mark on the tape exactly equals one inch in actual lineal measurement. Hence, when measuring distances with the tape unit positioned in the manner shown in Fig. 4, an operator need only compress the suction cup into engagement with the flat surface with the outermost point of the suction cup base contiguous with the point from which measurement is to be taken to obtain an accurate reading from the tape.

Although it is convenient and practical in many instances to utilize the suction cup to temporarily anchor one end of the tape to a flat surface for the purpose of taking measurement, there are also numerous situations where the point from which measurement is to be taken does not provide a suitable surface to which suction cup engagement can be made. In recognition of this latter fact, we provide alternative means for temporarily securing the tape end in situations where the suction cup may not be practical to utilize. More specifically and as above noted, we prefer to provide, in addition to the suction cup, an anchoring eye or loop 31 which is preferably made as an integral extension of hinge pin 29 pivotally connecting the tape to the suction cup pintle 22. Fig. 7 discloses how the anchoring loop 31 may be swung to a position between the tape and suction cup in situations where the suction cup is utilized to temporarily anchor the tape. Fig. 6, on the other hand, illustrates how the suction cup 18 can be swung upwardly and out of the way in situations where it is desired to utilize the loop 31 as the tape anchoring means. In order to insure accurate measurement reading directly off the tape, the distance between the outer end or length $31^a$ of the loop 31 and the one inch mark on the tape is made to equal exactly one inch when the loop is extended outwardly in the plane of the tape as shown in Fig. 6.

Although the present invention has been described in some detail by way of illustration and example for purposes of clarity of understanding, it is understood that certain changes and modifications may be practiced within in the spirit of the invention as limited only by the scope of the claims appended hereto.

We claim:

1. A measuring device comprising: a flexible tape graduated in consecutively numbered units of measure from a first end of said tape toward the opposite end thereof; a suction cup defining a circular, recessed base portion; universal coupling means connecting the first end of said tape to said suction cup to permit said tape to be extended in any direction to the coupling side of said suction cup; said suction cup yieldably compressible against a flat surface for temporarily anchoring the first end of said tape to said surface; the distance parallel to the tape between the outermost circumference of the base of the suction cup in compressed position and the first numbered graduation on said tape being equal to the unit of measure which said first graduation indicates when the tape is extended in a direction perpendicular to the medial axis of the suction cup; the shortest distance between the plane of the base of the suction cup in compressed position and the first numbered graduation on said tape being equal to the unit of measure which said first numbered graduation indicates when said tape is extended in the direction of the medial axis of said suction cup.

2. The combination of claim 1 and wherein said universal coupling means comprises first and second pivot means having their pivotal axes disposed perpendicular to one another; said first pivot means mounted on the upper surface of said suction cup and having its pivotal axis perpendicular to the plane of the base of said cup; the second pivot means carried by said first pivot means and connected to the first end of said tape and having its pivotal axis parallel to the plane of the base of said suction cup.

References Cited in the file of this patent

UNITED STATES PATENTS

| | | |
|---|---|---|
| 558,113 | Rodick | Apr. 14, 1896 |
| 2,077,318 | Goodman | Apr. 13, 1937 |
| 2,211,577 | Muserlian | Aug. 13, 1940 |
| 2,396,929 | Putnam | Mar. 19, 1946 |